(12) United States Patent
Kim et al.

(10) Patent No.: US 11,132,032 B2
(45) Date of Patent: Sep. 28, 2021

(54) METHOD OF MANUFACTURING WINDOW GLASS INCLUDING PLANAR PORTION AND ELECTRONIC DEVICE INCLUDING WINDOW GLASS

(71) Applicant: Samsung Electronics Co., Ltd., Gyeonggi-do (KR)

(72) Inventors: Donghun Kim, Gyeonggi-do (KR); Jungsik Park, Gyeonggi-do (KR); Hyunwoong Chung, Gyeonggi-do (KR); Jongchul Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 32 days.

(21) Appl. No.: 16/401,712

(22) Filed: May 2, 2019

(65) Prior Publication Data

US 2019/0339746 A1 Nov. 7, 2019

(30) Foreign Application Priority Data

May 2, 2018 (KR) .......................... 10-2018-0050888

(51) Int. Cl.
*G06F 1/16* (2006.01)
*H04N 5/225* (2006.01)
(Continued)

(52) U.S. Cl.
CPC .......... *G06F 1/1686* (2013.01); *G06F 1/1626* (2013.01); *H04M 1/0264* (2013.01);
(Continued)

(58) Field of Classification Search
CPC .. G06F 1/1686; G06F 1/1626; H04M 1/0264; H04M 1/0266; H04N 5/2253; H04N 5/2257
See application file for complete search history.

(56) References Cited

U.S. PATENT DOCUMENTS 8,886,031 B2  11/2014 Pope et al.
9,019,428 B2   4/2015 Shukla et al.
(Continued)

FOREIGN PATENT DOCUMENTS

| CN | 207218774 | 4/2018 |
|----|-----------|--------|
| JP | 2012-100034 | 5/2012 |
| KR | 1020150005704 | 1/2015 |

OTHER PUBLICATIONS

International Search Report dated Aug. 14, 2019 issued in counterpart application No. PCT/KR2019/005256, 10 pages.
(Continued)

*Primary Examiner* — Nicholas G Giles
(74) *Attorney, Agent, or Firm* — The Farrell Law Firm, P.C.

(57) ABSTRACT

Provided is an electronic device, which includes a first protector covering a first surface of the electronic device, wherein the first surface includes a curved region formed by the first protector and an opening region at least partially surrounded by the curved region, a camera module disposed inside the electronic device, and a bracket supporting the camera module. The camera module includes a lens assembly including a lens, a driver controlling the lens assembly, and a planar glass protecting the lens assembly. The planar glass is disposed at the opening region of the first surface.

15 Claims, 12 Drawing Sheets

(51) Int. Cl.
*H04M 1/02* (2006.01)
*C03C 27/06* (2006.01)
*C03B 23/023* (2006.01)
*C03B 33/02* (2006.01)
*C03C 19/00* (2006.01)

(52) U.S. Cl.
CPC ........ *H04M 1/0266* (2013.01); *H04N 5/2253* (2013.01); *H04N 5/2257* (2013.01); *C03B 23/023* (2013.01); *C03B 33/0222* (2013.01); *C03C 19/00* (2013.01); *C03C 27/06* (2013.01)

(56) References Cited

U.S. PATENT DOCUMENTS

| | | |
|---|---|---|
| 9,088,703 B2 | 7/2015 | Kim et al. |
| 9,462,165 B2 | 10/2016 | Moon et al. |
| 10,018,891 B2 | 7/2018 | Weber |
| 10,133,156 B2 | 11/2018 | Pilliod et al. |
| 2011/0050989 A1 | 3/2011 | Kim et al. |
| 2011/0116784 A1 | 5/2011 | Cheng |
| 2013/0051785 A1 | 2/2013 | Pope et al. |
| 2013/0215323 A1 | 8/2013 | Kim et al. |
| 2014/0063265 A1 | 3/2014 | Shukla et al. |
| 2014/0253799 A1 | 9/2014 | Moon et al. |
| 2014/0333830 A1 | 11/2014 | Cheon |
| 2016/0113135 A1 | 4/2016 | Kim et al. |
| 2019/0041909 A1* | 2/2019 | Pakula .................. G06F 1/26 |

OTHER PUBLICATIONS

European Search Report dated Aug. 9, 2021 issued in counterpart application No. 19796359.8-1216, 9 pages.

\* cited by examiner

METHOD OF MANUFACTURING WINDOW GLASS INCLUDING PLANAR PORTION AND ELECTRONIC DEVICE INCLUDING WINDOW GLASS

CROSS-REFERENCE TO RELATED APPLICATION(S)

This application is based on and claims priority under 35 U.S.C. § 119 to Korean Patent Application No. 10-2018-0050888, filed on May 2, 2018, in the Korean Intellectual Property Office, the entire disclosure of which is incorporated herein by reference.

BACKGROUND

1. Field

The disclosure relates generally to a method of manufacturing a window glass including a planar portion and an electronic device including the window glass.

2. Description of Related Art

In an electronic device, there is a tendency to increase a size of a display in order to provide a larger screen. As a result, a bezel region may be reduced to increase the size of the display. For a right and left side of the display, a curved display may be applied to eliminate or reduce the right and left side of the bezel region and allow a width of the display to be the substantially same as a width of the electronic device.

For an upper and lower side of the display, the bezel region may be reduced by applying the curved display to secure a space where a camera module is mounted. However, a curved display applied at an upper and lower side of the display on which a camera module is mounted often results in image distortion due to the curved glass.

SUMMARY

The present disclosure is made to address at least the disadvantages described above and to provide at least the advantages described below.

In accordance with an aspect of the disclosure, an electronic device is provided, which includes a first protector covering a first surface of the electronic device, wherein the first surface includes a curved region formed by the first protector and an opening region at least partially surrounded by the curved region; a camera module disposed inside the electronic device; and a bracket supporting the camera module. The camera module includes a lens assembly including a lens, a driver controlling the lens assembly, and a planar glass protecting the lens assembly. The planar glass is disposed at the opening region of the first surface.

In accordance with another aspect of the disclosure, an electronic device is provided, which includes a housing, a first glass that is formed on a first surface of the housing and including a display region and a bezel region surrounding at least a part of the display region, the bezel region including a curved portion formed in a curved shape; a display disposed within the housing, below the display region; and a sensor module disposed within the housing, the sensor module including a sensor and a second glass having a flat surface, which is disposed on the sensor. At least one opening region is formed at the curved portion of the bezel region. The second glass of the sensor module is positioned at the opening region.

In accordance with another aspect of the disclosure, a method of manufacturing a window glass is provided, which includes molding a glass to at least partially form a curved surface glass; forming an opening region by removing at least a part of the curved surface glass; and coupling the curved surface glass to a planar glass having a size smaller than or equal to the opening region.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
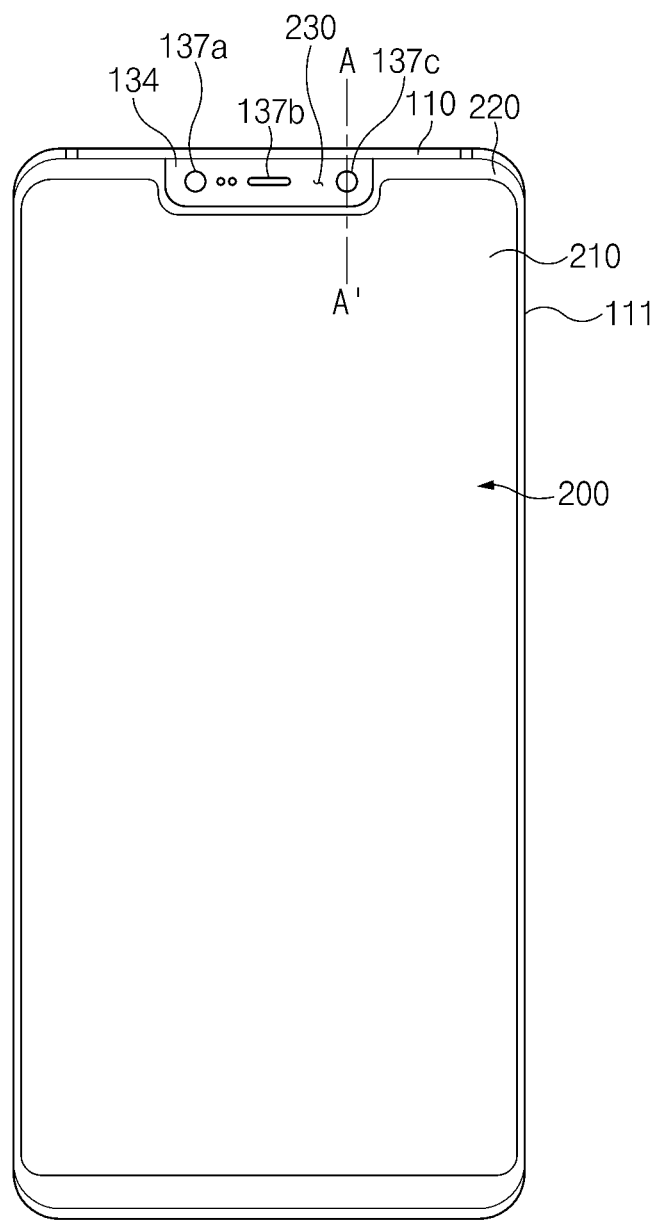
FIG. 1 illustrates an electronic device according to an embodiment.

Hereinafter, various embodiments of the disclosure are described with reference to accompanying drawings. Those of ordinary skill in the art will recognize that modification, equivalent, and/or alternative on the various embodiments described herein can be made without departing from the scope and spirit of the disclosure. For example, the size of each component in the drawings may be exaggerated or reduced for the convenience of explanation. The size and the thickness of each component in the drawings are provided only for the convenience of explanation, and the disclosure is not limited thereto. In addition, a Cartesian coordinate system is used, in which an x-axis direction may refer to the widthwise direction of the electronic device, a y-axis direction may refer to the lengthwise direction of the electronic device, and a z-axis direction may refer to the thickness direction of the electronic device. However, the x-axis, the y-axis, and the z-axis are not limited to three axes on the Cartesian coordinate system, and may be interpreted in a broad sense including the three axes. For example, the x-axis, the y-axis, and the z-axis may be orthogonal to each other, but may refer to different directions that are not orthogonal to each other.

With regard to description of drawings, similar components may be marked by similar reference numerals.

In the disclosure, the expressions "have", "may have", "include", "comprise", "may include", and "may comprise" used herein indicate existence of corresponding features (e.g., components such as numeric values, functions, operations, or parts) but do not exclude presence of additional features.

The expressions "A or B", "at least one of A or/and B", "one or more of A or/and B", etc., may include any and all combinations of one or more of the associated listed items. For example, the term "A or B", "at least one of A and B", or "at least one of A or B" may refer to (1) where at least one A is included, (2) where at least one B is included, or (3) where both of at least one A and at least one B are included.

Numerical terms, such as "first", "second", etc., may be used to refer to various components regardless of the order and/or the priority but do not limit the components. Numerical terms may be used to distinguish the relevant components from other components, e.g., "a first user device" and "a second user device" may indicate different user devices regardless of the order or priority. Without departing the scope of the disclosure, a first component may be referred to as a second component, and similarly, a second component may be referred to as a first component.

When a component (e.g., a first component) is referred to as being "(operatively or communicatively) coupled with/to" or "connected to" another component (e.g., a second component), the first component may be directly coupled with/to or connected to the second component or an intervening component (e.g., a third component) may be present therebetween. In contrast, when the first component is referred to as being "directly coupled with/to" or "directly connected to" the second component, there is no intervening component therebetween.

According to context, the expression "configured to" used in the disclosure may be used interchangeably with "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "central processing unit (CPU) configured to (or set to) perform A, B, and C" may indicate a dedicated CPU (e.g., an embedded CPU) for performing a corresponding operation or a generic-purpose CPU (e.g., CPU or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. Terms, which are defined in a dictionary and commonly used, should also be interpreted as is customary in the relevant related art and not in an idealized or overly formal unless expressly so defined in the disclosure. In some cases, even if terms are terms which are defined in the disclosure, they may not be interpreted to exclude embodiments of the disclosure.

Electronic devices according to various embodiments of the disclosure may include smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., smart glasses, head-mounted-devices (HMDs)), electronic apparel, electronic bracelets, electronic necklaces, electronic appcessories, electronic tattoos, smart mirrors, or a smart watches.

Electronic devices may also include smart home appliances, such as televisions (TVs), digital versatile disk (DVD) players, audio devices, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, etc.

Electronic devices may also include medical devices (e.g., various portable medical measurement devices, such as blood glucose monitoring devices, heartbeat measuring devices, blood pressure measuring devices, body temperature measuring devices, etc., magnetic resonance angiography (MRA) devices, magnetic resonance imaging (MRI) devices, computed tomography (CT) devices, scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) devices, or Internet of things (IoT) devices (e.g., light bulbs, various sensors, electric or gas meters, sprinkler devices, fire alarms, thermostats, street lamps, toasters, exercise equipment, hot water tanks, heaters, boilers, etc.).

Electronic device may also include parts of furniture or buildings/structures, electronic boards, electronic signature receiving devices, projectors, or various measuring instruments (e.g., water meters, electricity meters, gas meters, or wave meters, etc.).

An electronic device may also be a flexible electronic device.

An electronic device may also be a combination of the above-described devices. However, an electronic device according to an embodiment of the disclosure is not limited to the above-described electronic devices and may include other electronic devices and new electronic devices according to the development of technologies.

FIG. 1 illustrates an electronic device according to an embodiment.

Referring to FIG. 1, the electronic device includes a housing 110 and a window glass 200 formed on a first surface 111 of the housing 110. For example, the window glass 200 may form a front surface of the electronic device or may be disposed on at least the first surface 111 of the housing 110. The window glass 200 may extend to both sides connected to the first surface 111 of the housing 110.

The window glass 200 may be applied to a mobile device or a display for the mobile device. The display may have a variety of display panels such as a liquid crystal display (LCD), a light emitting diode (LED), or a plasma display panel (PDP).

The window glass 200 includes a display region 210, a bezel region 220 surrounding at least a part of the display region 210, and an opening region 230 surrounded by at least a part of the bezel region 220.

A display may be disposed at the display region 210. Generally, the display region 210 may be formed at the front surface of the electronic device, but is not limited thereto, and may be formed at the both sides of the electronic device. The display may include a pixel array including a plurality of light emitting devices. Light generated from the pixel array may pass through the display region 210 to display a screen. The display disposed below the display region 210 may include a touch screen panel.

The display region 210 may include a planar portion configured to have a flat surface and/or a curved portion configured to have a curved surface. Alternatively, the entire display region 210 may be formed to have a curved surface and may be curved in various directions. The display and the display region 210 may be curved to have the same curvature.

The bezel region 220 may be disposed at a periphery of the display region 210. At least a part of the display region 210 may be surrounded by the bezel region 220.

As illustrated in FIG. 1, the bezel region 220 surrounds the entire display region 210. However, the bezel region 220 is not limited to surrounding the entire display region 210. For example, the bezel region 220 may surround just the right and left sides of the display region 210 or may surround just the upper and lower sides of the display region 210.

The bezel region 220 may be formed to have a color and/or a pattern, which generates aesthetic appreciation. The bezel region 220 may be formed of an opaque material.

The bezel region 220 may include a curved portion. Alternatively, at least a part of the bezel region 220 may be formed in a curved shape. The curved portion of the bezel region 220 may be connected to the curved portion of the display region 210 and may have the same curvature as that of the curved portion of the display region 210.

The opening region 230 may be formed at the curved portion of the bezel region 220. The opening region 230 may be formed to pass through the curved portion. The opening region 230 may be an opening formed to pass through the electronic device in a direction perpendicular to the front surface of the electronic device.

A planar glass 134 configured to have a flat surface may be disposed on or formed on the opening region 230. At least a part of the opening region 230 may be surrounded by the curved portion of the bezel region 220.

As illustrated in FIG. 1, the opening region 230 may be formed to include an end of the bezel region 220. For example, the opening region 230 may include an upper end of the bezel region 220 or may be formed at the upper end of the bezel region 220.

The opening region 230 may be formed in various shapes. The opening region 230 may be formed with one side open. For an example, the opening region 230 may be formed in a U-cut shape, as illustrated in FIG. 1, or the opening region 230 may formed in a closed shape. In this case, the opening may be formed in a hole shape.

As illustrated in FIG. 1, the planar glass 134 disposed at the opening region 230 may include at least one opening 137b. The at least one opening 137b may be formed at the planar glass 134. The planar glass 134 includes transparent regions 137a and 137c formed to be transparent. The transparent regions 137a and 137c may be visually shown as apertures.

A receiver may be disposed at the opening 137b. Sensors may be disposed below the transparent regions 137a and 137c, respectively.

Figure 2:
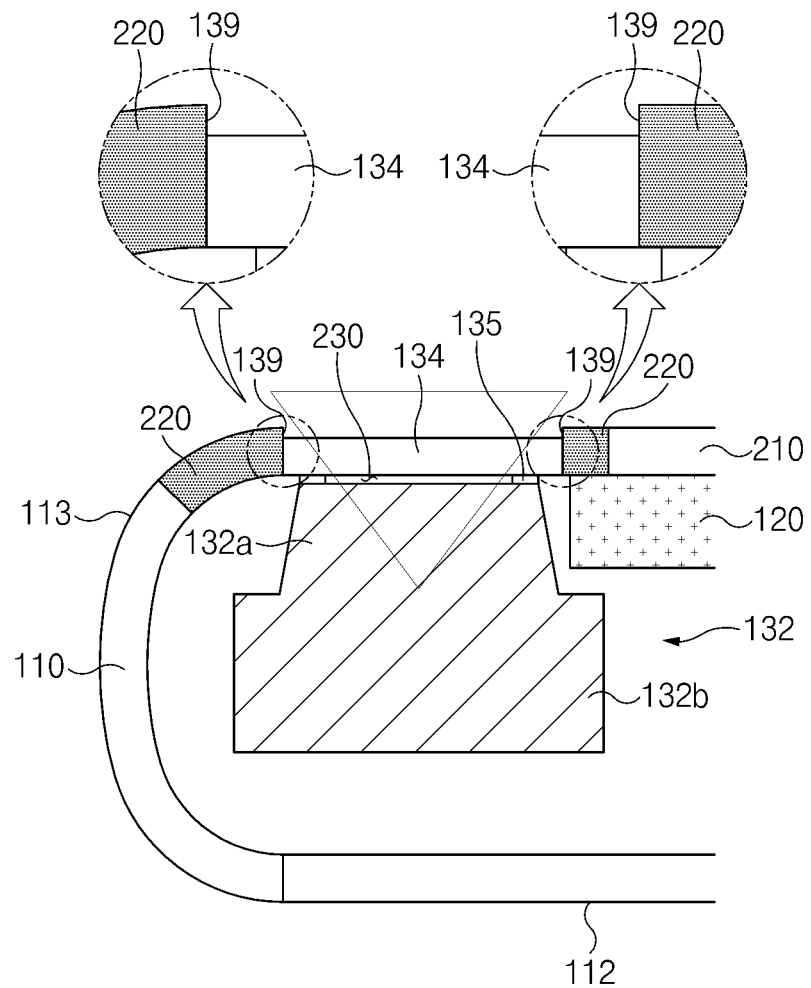
FIG. 2 illustrates a cross-sectional view of an electronic device according to an embodiment.

FIG. 2 illustrates a cross-sectional view of the electronic device according to an embodiment. Specifically, FIG. 2 illustrates a cross-sectional view taken along a line A-A' of FIG. 1.

Hereinafter, a direction in which a sensor faces will be referred to as an upper side, for ease of description.

Referring to FIG. 2, the electronic device includes the housing 110, the window glass formed on at least a first surface of the housing 110, and a sensor 132 disposed inside the housing 110.

The housing 110 includes the first surface, where the window glass is formed and disposed at an upper side of the housing 110, a second surface 112 disposed at a lower side of the housing 110, and a third surface 113 disposed between the first surface and the second surface 112. The first surface of the housing 110 may be included in the front surface of the electronic device.

The window glass includes the display region 210, the bezel region 220 surrounding at least of a part of the display region 210, and the opening region 230 at least partially surrounded by the bezel region 220.

A display 120 is disposed below the display region 210. The display 120 may be exposed to the front surface of the electronic device through the transparent display region 210.

The bezel region 220 of the window glass may be formed at a position adjacent to an end of the first surface of the housing 110. The bezel region 220 may be formed at least partially in a curved shape. The curved surface may be formed to surround at least a part of the opening region 230.

The opening region 230 may be formed on at least one surface of the housing 110 where the bezel region 220 is formed. In FIG. 2, the opening region 230 is formed at the first surface of the housing 110, like the bezel region 220. As described above, the opening region 230 may be formed with one side open or may be formed in a closed shape. As illustrated in FIG. 2, the opening region 230 is formed to be open toward one end of the bezel region 220.

The planar glass 134 is disposed at the opening region 230. The planar glass 134 may be formed as a flat surface. The bezel region 220 at a periphery of the opening region 230 may be formed at least partially in a curved shape.

The planar glass 134 disposed at the opening region 230 may be connected to the bezel region 220 of the periphery of the opening region 230. The planar glass 134 formed in flat shape may be connected to the bezel region 220 of the periphery of the opening region 230 formed in the curved shape through a step 139.

Alternatively, the planar glass 134 connected to the bezel region 220 at a slant. For example, a periphery of the bezel region 220 surrounding at least a part of the opening region 230 may be formed as an inclined surface and the inclined surface may be connected to the planar glass 134.

The planar glass 134 may be disposed further down than the bezel region 220 of the periphery of the opening region 230. The inclined surface formed between the planar glass 134 and the bezel region 220 may be inclined from the bezel region 220 toward the planar glass 134. The planar glass 134 may be formed of a transparent material so that light incident on the sensor 132 may pass therethrough.

In FIG. 2, the planar glass 134 is connected to the bezel region 220 through the certain step 139. At least a part of an outer part of the planar glass 134 may be connected to the bezel region 220 through the step 139.

The sensor 132 is disposed below the planar glass 134. The sensor 132 may be disposed between the first surface of the housing 110 and the second surface 112 of the housing 110.

The sensor 132 may be supported on a substrate.

In FIG. 2, the sensor 132 includes a first part 132a disposed below the planar glass 134 and a second part 132b downwardly extending from the first part 132a. The first part 132a may be formed to have a cross sectional area smaller than that of the second part 132b. The first part 132a and the second part 132b may be formed to be stepped. A stepped surface 133 may be formed between the first part 132a and second part 132b.

At least one adhesive 135 may be disposed between the planar glass 134 and the sensor 132. The adhesive 135 may include a tape to adhere the sensor 132 to the planar glass 134.

The electronic device may further include the substrate disposed inside the housing 110.

A plurality of circuits and a processor for driving the electronic device depending on types of electronic device may be disposed at the substrate.

The sensor 132 may include one or more image sensors (e.g., a front sensor or a rear sensor) for capturing a still image or a moving image, and may include a lens, an image signal processor (ISP), a flash (e.g., an LED or a xenon lamp), etc.

The sensor 132 may include a camera module including at least one lens and a driving circuit for driving the lens.

The sensor 132 may include at least one of a proximity sensor, an illuminance sensor, a gesture sensor, a motion sensor, a fingerprint recognition sensor, and a biometry sensor.

Figure 3:
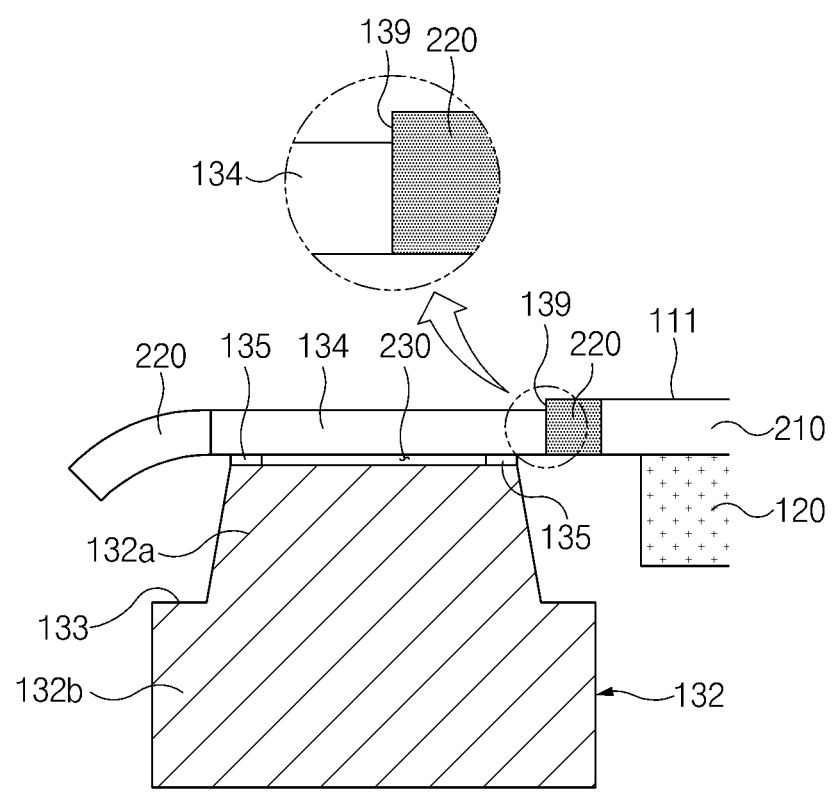
FIG. 3 illustrates a cross-sectional view of a part of an electronic device according to an embodiment.

FIG. 3 illustrates a cross-sectional view of a part of an electronic device according to an embodiment. Specifically, FIG. 3 illustrates a cross-sectional view taken along a line A-A' of FIG. 1.

Referring to FIG. 3, the electronic device include the window glass formed on at least one surface of the electronic device, the sensor 132 and the display 120, which are disposed below the window glass. The same description as that described above will be omitted.

The window glass includes the display region 210 under which the display 120 is disposed, the bezel region 220 surrounding the display region 210, and the opening region 230 surrounded by the bezel region 220. The planar glass 134 is disposed at the opening region 230.

The planar glass 134 may be connected to the bezel region through the certain step 139. At least a part of an outer part of the planar glass 134 may be connected to the bezel region 220 through the step 139.

The sensor 132 is disposed below the planar glass 134. As described above, the sensor 132 may be a camera device.

At least one adhesive 135 may be disposed between the planar glass 134 and the sensor 132. The adhesive 135 may include a tape to adhere the sensor 132 to the planar glass 134.

The planar glass 134 may be formed of an elastic material to relieve impact applied to the planar glass 134 and the sensor 132. The adhesive 135 may be disposed outside of a lens of the sensor 132 to prevent blocking light incident on the lens. Alternatively, the adhesive 135 may be formed in a ring shape to be disposed at a periphery of the sensor 132. The adhesive 135 may be formed of a transparent material in the same manner as the planar glass 134.

Figure 4:
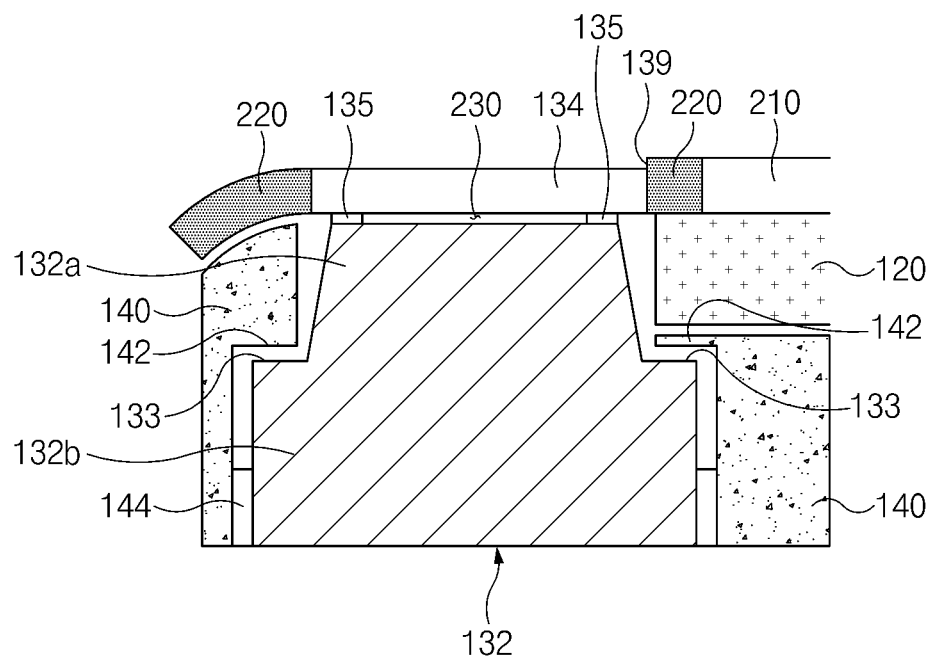
FIG. 4 illustrates a cross-sectional view of a part of an electronic device according to an embodiment.

FIG. 4 illustrates a cross-sectional view of a part of the electronic device according to an embodiment. Specifically, FIG. 4 illustrates a cross-sectional view taken along a line A-A' of FIG. 1.

Referring to FIG. 4, the electronic device includes the window glass formed at one side of the electronic device, and the sensor 132 and the display 120, which are disposed below the window glass. The window glass includes the bezel region 220 and the opening region 230 surrounded by at least a part of the bezel region 220. The planar glass 134 is disposed at the opening region 230. The sensor 132 is disposed below the planar glass 134.

At least one adhesive 135 may be disposed between the planar glass 134 and the sensor 132 to adhere the planar glass 134 to the sensor 132.

The display 120 is disposed below the display region 210. At least a part of the sensor 132 is disposed below the bezel region 220. The sensor 132 is surrounded by a bracket 140, which includes a supporting protrusion 142 disposed between the bezel region 220 and at least a part of the sensor 132 disposed below the bezel region 220.

The sensor 132 includes the first part 132a disposed directly beneath the planar glass 134 and the second part 132b extending to the lower side of the first part 132a. The first part 132a and the second part 132b may be connected to each other to be formed be stepped. The stepped surface 133 may be formed between the first part 132a and the second part 132b.

The bracket 140 is disposed inside the housing 110 to stably support the sensor 132 inside the housing 110. The bracket 140 may be disposed at the second surface 112 of the housing 110.

The bracket 140 may have a space therein to allow the sensor 132 to be inserted. The inner space of the bracket 140 may be formed to be spaced apart from the sensor 132 by a predetermined distance. The bracket 140 may have a hole penetrating in a vertical direction and the sensor 132 may be mounted inside the hole.

At least one elastic member 144 may be disposed between an inner wall of the bracket 140 and the sensor 132. The elastic member 144 may be formed as an integral ring surrounding a lateral surface or an outer circumference surface of the sensor 132. The elastic member 114 may be formed of a material having elasticity. The elastic member 144 may relieve impact applied to the bracket 140 or the sensor 132.

The supporting protrusion 142 may be formed at an upper end of the bracket 140. The supporting protrusion 142 may protrude in an inward direction of the bracket 140. The supporting protrusion 142 may be disposed to face the stepped surface 133 of the sensor 132.

At least a part of the bracket 140 may be disposed below the display 120. A part of the upper surface of the bracket 140 may support the display 120. A part of the upper surface of the bracket 140 may support the bezel region 220. The supporting protrusion 142 may extend from the upper surface of the bracket 140 in the inward direction of the bracket 140 where the sensor 132 is mounted.

Preferably, the supporting protrusion 142 is not exposed to the front surface of the electronic device through the planar glass 134. The supporting protrusion 142 may extend from the upper surface of the bracket 140 to be disposed below the bezel region 220.

A part of the bracket 140 may be disposed below bezel region 220 and the other part of the bracket 140 may be disposed below the display 120 so that the bracket 140 is not be exposed through the transparent planar glass 134.

Figure 5:
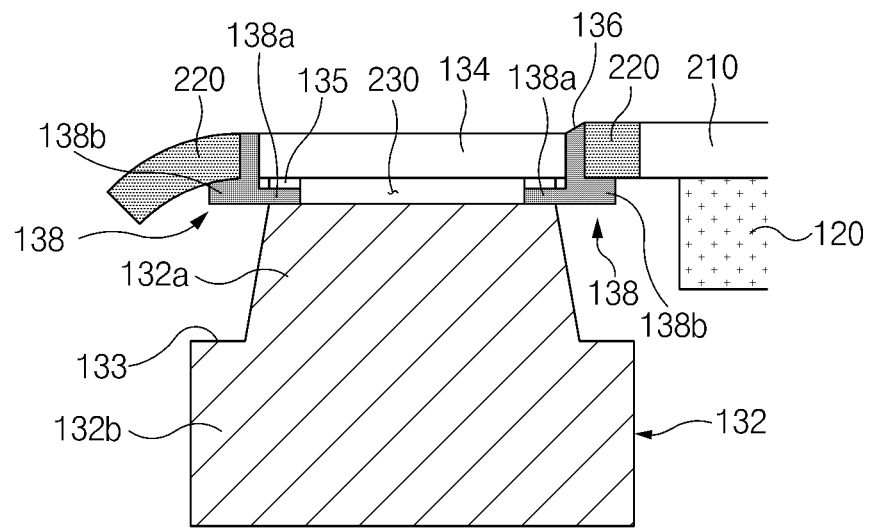
FIG. 5 illustrates a cross-sectional view of a part of an electronic device according to an embodiment.

FIG. 5 illustrates a cross-sectional view of a part of an electronic device according to an embodiment. Specifically, FIG. 5 illustrates a cross-sectional view taken along a line A-A' of FIG. 1.

Referring to FIG. 5, the electronic device includes the window glass formed at a surface of the electronic device, and the sensor 132 and the display 120, which are disposed below the window glass.

The electronic device illustrated in FIG. 5 furthers include a connector 138 disposed between the planar glass 134 and the bezel region 220. The connector 138 may be formed in a shape corresponding to the opening region 230 along a space between the opening region 230 and the bezel region 220.

The connector 138 may be formed of an opaque material and/or may have at least one of a color, a design, or a pattern to provide aesthetic appreciation. The connector 138 includes an inclined surface 136 connecting an upper surface of the bezel region 220 and an upper surface of the planar glass 134 through the step 139. The inclined surface 136 may be formed at a portion where the planar glass 134 and the bezel region 220 is connected to each other through the step 139.

The connector 138 includes a first supporter 138a and a second supporter 138b. At least a part of the first supporter 138a and the second supporter 138b may be supported by the sensor 132.

The first supporter 138a may be disposed between the planar glass 134 and the sensor 132. The first supporter 138a may extend from the connector 138 in an inward direction of the planar glass 134. The first supporter 138a may extend below the planar glass 134. The first supporter 138a may support a lower side of the planar glass 134. At least one of adhesive 135 may be disposed between the first supporter 138a and the planar glass 134. The second supporter 138b may extend from the connector 138 in an outward direction of the planar glass 134. The second supporter 138b may extend below the bezel region 220. The second supporter 138b may support a lower side of the bezel region 220 in a periphery of the opening region 230.

Figure 6A:
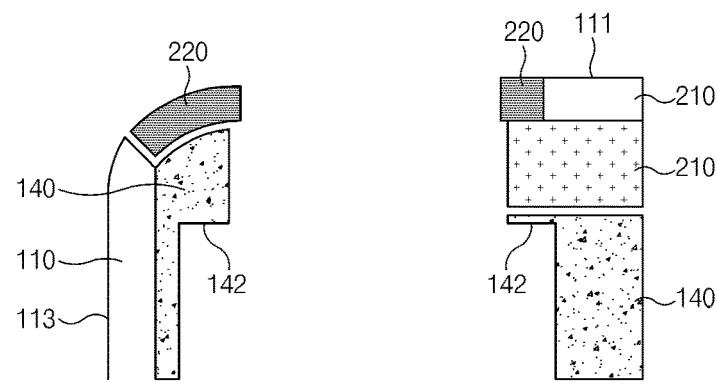
FIGS. 6A to 6C illustrate a procedure for assembling a camera module in an electronic device according to an embodiment.
Figure 6B:
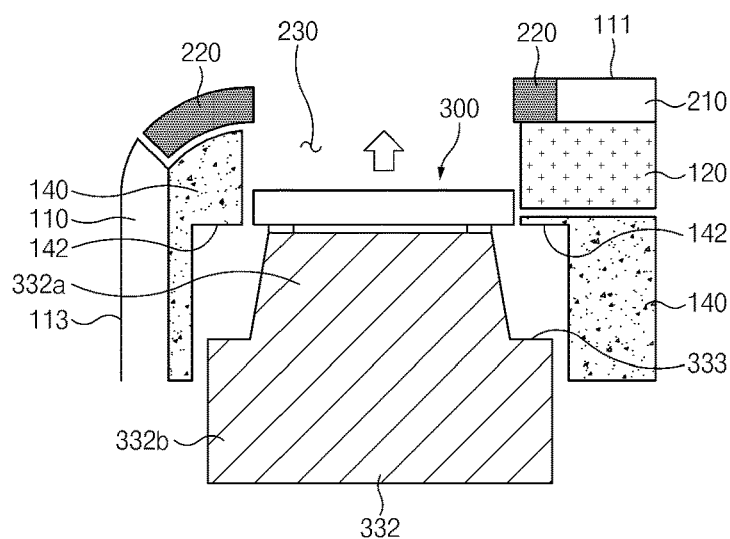
Figure 6C:
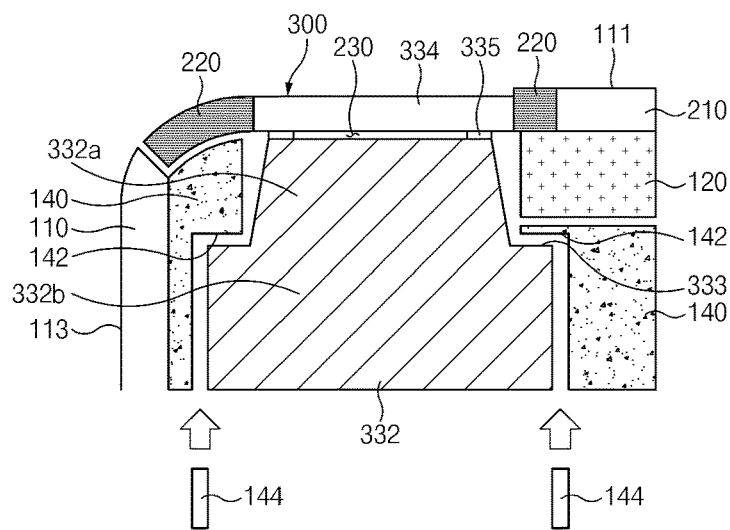

FIGS. 6A to 6C illustrate a procedure for assembling a camera module in an electronic device according to an embodiment.

Referring to FIGS. 6A to 6C, the electronic device includes the housing 110 including the first surface 111 and the third surface 113, the opening region 230 formed on at least the first surface 111 of the housing 110, the bezel region 220 surrounding at least a part of the opening region 230, the display region 210 at least partially surrounded by the bezel region 220, and a camera module 300 mounted at the bezel region 220.

Alternatively, the electronic device may include window glass, which is disposed on at least the first surface 111 of the housing 110 and includes the opening region 230, the bezel region 220, and the display region 210. The opening region 230 may be formed to vertically pass through the first surface 111 of the housing 110.

The camera module 300 includes a camera device 332 including at least one lens, a camera glass 334 disposed on the camera device 332, and an adhesive 335 disposed between the camera glass 334 and the camera device 332. The camera glass 334 may be formed as a flat surface, similar to the planar glass 134 of FIGS. 2 to 5. The bezel region 220 may be formed as a curved surface.

The camera device 332 includes a first part 332a disposed below the camera glass 334 and a second part 332b extending downwardly from the first part 332a. The first part 332a may be formed to have a cross sectional area smaller than that of the second part 332b. The first part 332a and the second part 332b may be formed to be stepped. A stepped surface 333 may be formed between the first part 332a and the second part 332b.

The camera glass 334 may be formed to have a size, which covers or includes an angle of view of the camera device 332. The camera glass 334 may have a size corresponding to the opening region 230 or may be press-fitted in the opening region 230 not to expose the camera device 332 to a gap between the camera glass 334 and the bezel region 220.

The bracket 140 may stably support the camera device 332 inside the housing 110. The bracket 140, into which the camera device 332 is capable of being inserted, may have a cylinder shape. The supporting protrusion 142 may be formed at an upper end of the bracket 140 to support the camera device 332. The supporting protrusion 142 of the bracket 140 may extend from an upper surface of the bracket 140 in an inward direction of the bracket 140 where the camera device 332 is mounted.

In this case, the extended supporting protrusion 142 may be formed below the bezel region 220 so as not to be exposed to a front surface of the electronic device through the transparent camera glass 334. The bracket 140 may be disposed inside the housing 110, and at least a part of the bracket 140 may be disposed below the display 120. At least a part of the bracket 140 may be disposed below the bezel region 220.

As illustrated in FIG. 6, the camera module 300 may be inserted into the opening region 230. The camera device 332 may be mounted at the bracket 140 disposed inside the housing 110. For example, the stepped surface 333 of the camera device 332 may be disposed to face the supporting protrusion 142 of the bracket 140. Thus, the first part 332a of the camera device 332 may be exposed above the bracket 140 and the second part 332b may be disposed inside the bracket 140. The camera glass 334 may be disposed at the opening region 230 to form the first surface 111 of the housing 110.

After the camera glass 334 is disposed at the opening region 230, the elastic member 144 may be inserted between the bracket 140 and the camera device 332 to firmly fasten the camera device 332. For example, the elastic member 144 may be disposed between the second part 332b of the camera device 332 and the bracket 140. The camera device 332 may be press-fitted into the bracket 140 by the elastic member 144.

The camera module 300, in which the camera device 332 and the camera glass 334 are modularized, may be assembled to the housing 110 to easily mount the camera module 300 or the sensor 132 on the electronic device.

Figure 7C:
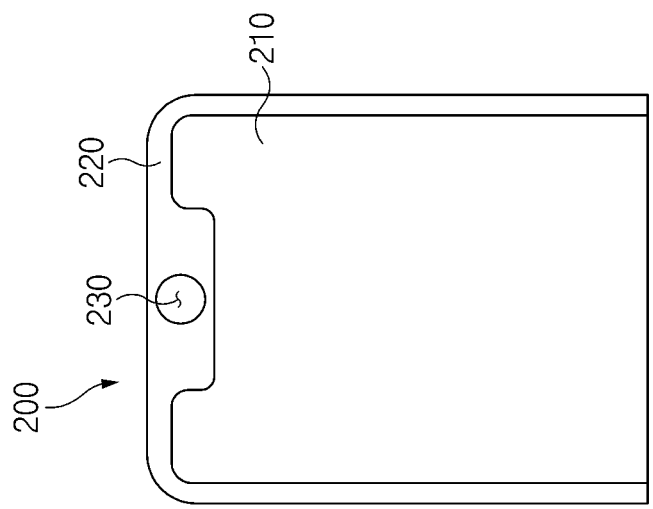
FIGS. 7A to 7C illustrate different configurations of a window glass of an electronic device according to an embodiment.
Figure 7B:
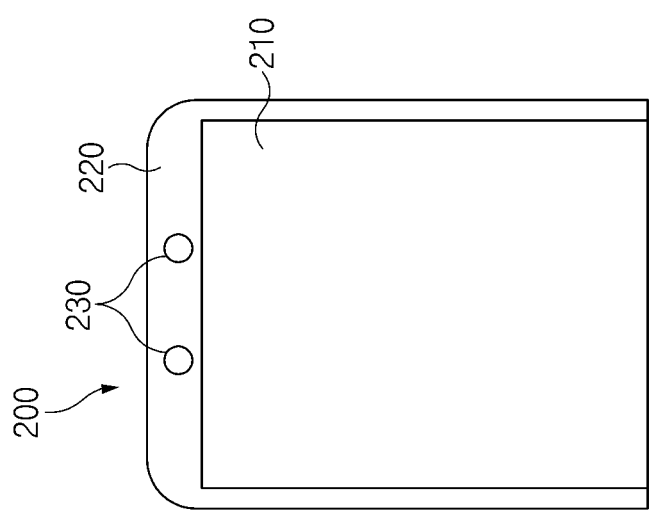
Figure 7A:
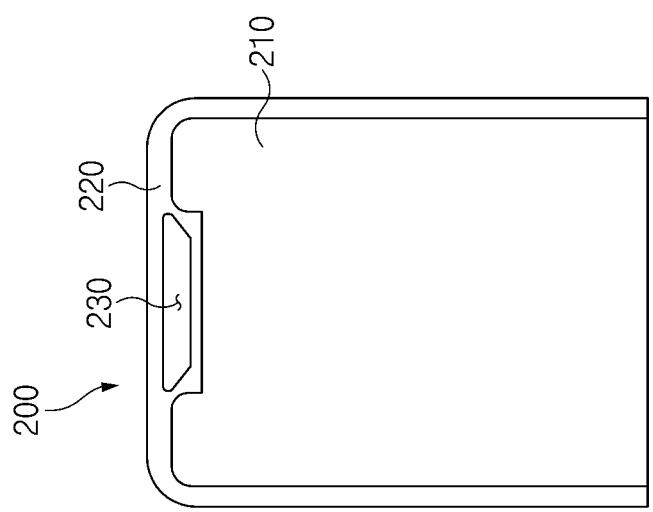

FIGS. 7A to 7C illustrate different configurations of a window glass of an electronic device according to an embodiment.

Referring to FIGs. FIGS. 7A to 7C, the window glass 200 includes the display region 210, the bezel region 220 surrounding the display region 210, and the opening region 230 formed at the bezel region 220.

The opening region 230 may be surrounded by the bezel region 220. The opening region 230 may have a closed polygonal shape, when viewed from a front surface of the electronic device. The opening region 230 may be formed in a shape of a hole. The opening region 230 may be formed in a plurality of openings.

Alternatively, as illustrated in FIG. 1, the opening region 230 may have in a polygonal shape with one open side, or one planar glass may be disposed at the opening region 230 and a plurality of openings may be formed at one planar glass or one camera glass.

Although FIGS. 7A to 7C illustrate the display region 210 as having a rectangular shape, the disclosure is not limited thereto. For example, the display region 210 may be formed in a circular or polygonal shape.

Figure 8:
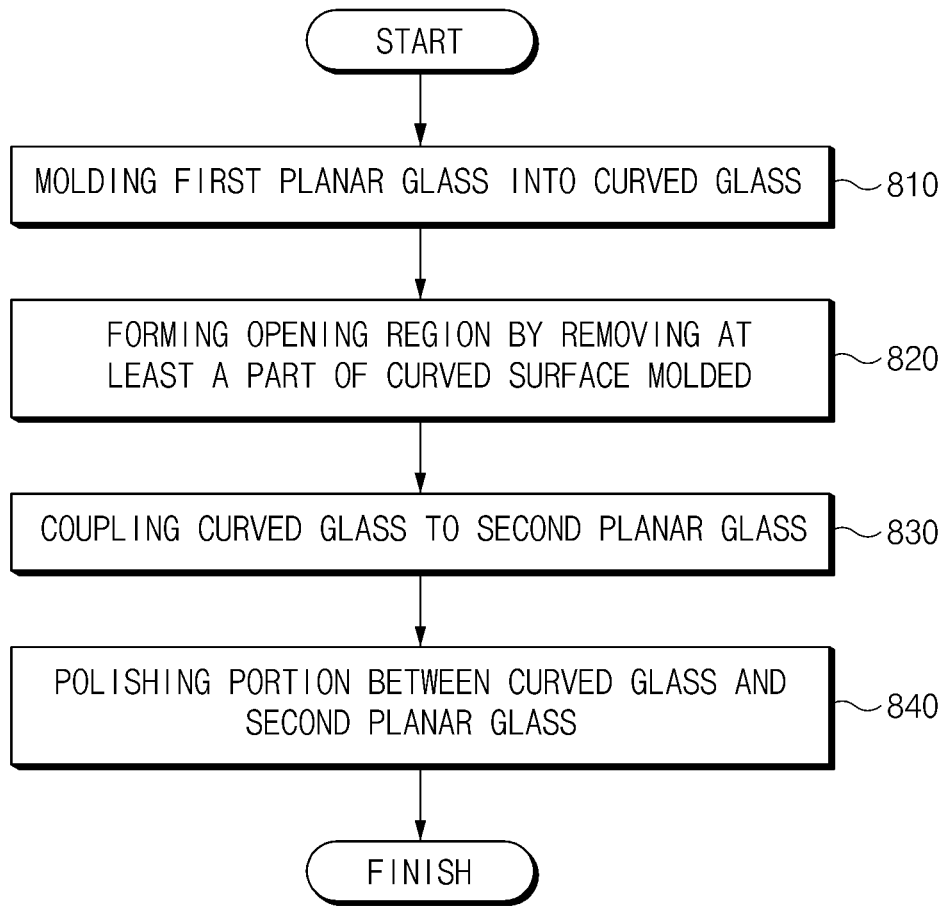
FIG. 8 is a flowchart illustrating a method of manufacturing a window glass according to an embodiment.

FIG. 8 is a flowchart illustrating a method of manufacturing a window glass according to an embodiment. For example, the manufactured window glass may include a curved portion and a planar glass may be disposed on at least a part of the window glass.

Referring to FIG. 8, in step 810, a first planar glass is molded into a curved glass. For an example, the curved glass may be formed by thermoforming the first planar glass so that at least a part of the first planar glass may be formed into a curved surface. As another example, a periphery of the first planar glass may be formed as a curved surface. In this case, the curved periphery may be formed as a bezel region and a central part having a planar surface may be formed as a display region.

In step 820, an opening region is formed by removing at least a part of the curved surface where the first planar glass is molded. For example, the opening region may be formed using a laser cutting or a computer numerical control (CNC) machine. The opening region formed at the curved portion may pass through the curved portion in a direction perpendicular to the ground. When using the CNC machine, the curved portion may be cut along a path on the curved glass corresponding to a shape of the opening region. The predetermined path may include at least one path set at the region having the curved surface. The predetermined path may include a circular path or a polygonal path including a curved line and a straight line. At least a part of the cut opening region may be surrounded by the curved glass.

In step 830, the curved glass and the second planar glass are coupled to each other. For example, the second planar glass may be disposed at the opening region formed in the curved surface. The second planar glass may be coupled to the opening region of the curved glass so that a side wall of the second planar glass may come in contact with an inner wall of the opening region. The inner wall of the opening region and the side wall of the second planar glass may be coupled to each other through a step. The planar glass and the curved glass of the periphery of the opening region may be adhered to each other using an adhesive. The adhesive may be formed of a transparent material, e.g., an optical clear resin (OCR) or an optical clear adhesive (OCA).

A partly opaque connector, such as a deco-ring, may be disposed between the second planar glass and the curved glass of the periphery of the opening region. The connector may be formed to have a shape corresponding to the opening region. The connector may be formed to extend along the inner wall of the opening region.

The second planar glass may be formed to have a size equal to or smaller than that of the opening region as described above. A sensor, such as a camera device, may be installed under the second planar glass.

In step 840, a portion between the curved glass and the second planar glass is polished. For example, the adhesive (e.g., the optical clear adhesive) disposed between the curved glass and the second planar glass may be removed when the adhesive is exposed to the surface.

Figure 9:
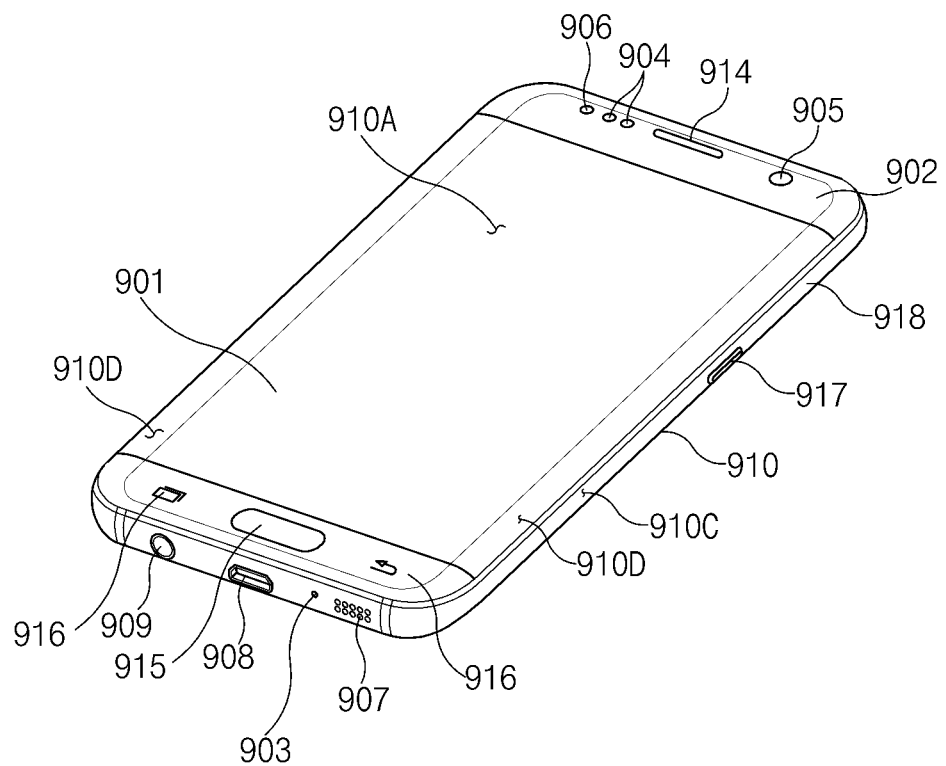
FIG. 9 illustrates a front surface of a mobile electronic device according to an embodiment.
Figure 10:
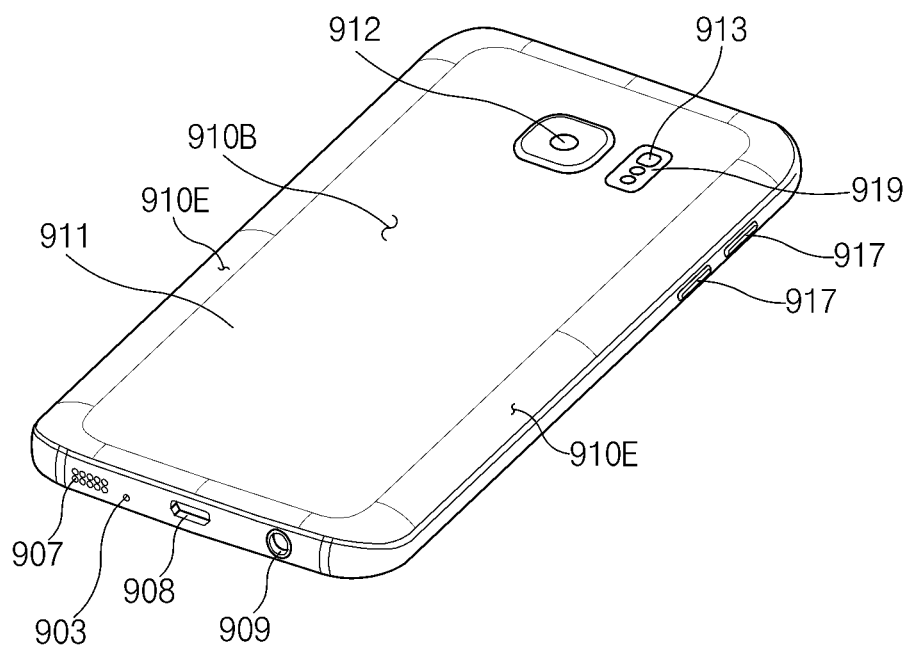
FIG. 10 illustrates a rear surface of the electronic device of FIG. 9.

FIG. 9 illustrates a front surface of a mobile electronic device according to an embodiment. FIG. 10 illustrates a rear surface of the electronic device of FIG. 9.

Referring to FIGS. 9 and 10, the electronic device includes a housing including a first surface (or a front surface) 910A, a second surface (or a rear surface) 910B, and a side surface surrounding a space between the first surface 910A and the second surface 910B. The housing may be referred to as a structure forming a part of the first surface 910A, the second surface 910B, and the side surface 910C of FIG. 10.

The first surface 910A may be formed by a front plate 902 (e.g., a glass plate including various coating layers or a polymer plate) being at least partially transparent. The second surface 910B may be formed by a substantially opaque rear plate 911. The rear plate 911 may be formed of a glass coated or pigmented, ceramic, polymer, or metal (e.g., aluminum, stainless steel (STS), or magnesium), or a combination of at least two of the materials.

The side surface 910C may be coupled to the front plate 902 and the rear plate 911 and may be formed by a side bezel structure (e.g., a "side member") 918 including metal and/or polymer. The rear plate 911 and the side bezel structure 918 may be integrally formed and include the same material (e.g., a metal material such as aluminum).

The front plate 902 includes two first regions 910D being bended from the first surface 910A toward the rear plate 911 to seamlessly extend. Both ends of a long edge of the front plate 902 may include the first regions 910D.

In FIG. 10, the rear plate 911 includes two second regions 910E being bended from the second surface 910B toward the front plate 902 to seamlessly extend. Both ends of a long edge of the rear plate 911 may include the second region 910E.

The front plate 902 (or the rear plate 911) may include one of the first regions 910D (or the second region 910E). Alternatively, a part of the first regions 910D or the second regions 910E may be not included.

When viewed from a side surface of the electronic device, the side bezel structure 918 may have a first thickness (or a width) when the first regions 910D or the second regions 910E are not included and may have a second thickness smaller than the first thickness when the first regions 910D or the second regions 910E are included.

The electronic device includes a display 901, audio modules 903, 907, and 914, sensor modules 904 and 919, camera modules 905, 912, and 913, key input devices 915, 916, and 917, an indicator 906, and connector holes 908 and 909. Alternatively, the electronic device may omit at least one of the components (e.g., the key input device 915, 916, or 917, or the indicator 906) or may include an additional component.

The display 901 may be exposed through a large part of the front plate 902. At least a part of the display 901 may be exposed through the front plate 902 forming the first surface 910A and the first regions 910D of the side surface 910C. The display 901 may be coupled to or be disposed adjacent to a touch detection circuit, a pressure sensor capable of measuring intensity (pressure) of touch, and/or a digitizer detecting a stylus pen of a magnetic method. At least a part of the sensor module 904 or 919 and/or at least a part of the key input device 915, 916, or 917 may be disposed at the first regions 910D and/or the second regions 910E.

The audio modules 903, 907, and 914 may include a microphone hole 903 and speaker holes 907 and 914. A microphone may be disposed inside the microphone hole 903 to obtain outside sounds. A plurality of microphones may be disposed inside the microphone hole 903 to detect directions of the sounds. The speaker holes 907 and 914 may include the outside speaker hole 907 and the receiver hole 914 for the call. The speaker holes 907 and 914 and the microphone hole 903 may be configured as one hole, or a speaker without the speaker holes 907 and 914 (e.g., a piezo speaker) may be provided.

The sensor modules 904 and 919 may generate an electric signal or a data value corresponding to an operating state inside the electronic device or an external environment state. The sensor modules 904 and 919 may include a proximity sensor disposed at the first surface 910A of the housing 910 and/or an HRM sensor disposed at the second surface 910B of the housing 910. A fingerprint sensor may be disposed at the second surface 910B of the housing 910 as well as the first surface 910A (e.g., the home key button 915) of the housing 910.

The electronic device may further include at least one of sensors such as a gesture sensor, a gyro sensor, a barometric pressure sensor, a magnetic sensor, an acceleration sensor, a grip sensor, a color sensor, an infrared sensor, a humidity sensor, and an ambient light sensor.

The camera modules 905, 912, and 913 may include a first camera device 905 disposed at the first surface 910A of the electronic device, a second camera device 912, and a flash 913, which are disposed at the second surface 910B of the electronic device. The camera devices 905 and 912 may include one lens or a plurality of lenses, an image sensor, and/or an image signal processor. The flash 913 may include an LED or a xenon lamp. At least two lenses (an infrared camera, a wide angel, and/or telephoto lens) and image sensors may be disposed at one side of the electronic device.

The key input devices 915, 916, and 917 may include a home key button 915 disposed at the first surface 910A of the housing 910, a touch pad 916 disposed around the home key button 915, and a side key button 917 disposed at the side surface 910C of the housing 910. Alternatively, the electronic device may not include some or all of the key input devices 915, 916, and 917, and/or the key input device 915, 916, or 917 which is not included may be configured in a different shape such as a soft key on the display 901.

The indicator 906, e.g., an LED, may be disposed on the first surface 910A of the housing 910, and may provide status information of the electronic device in optical form.

The connector holes 908 and 909 may include a universal serial bus (USB) connector for transmitting/receiving power and/or data to/from an external electronic device and/or an earphone jack accommodating a connector for transmitting/receiving an audio signal to/from an external electronic device.

Figure 11:
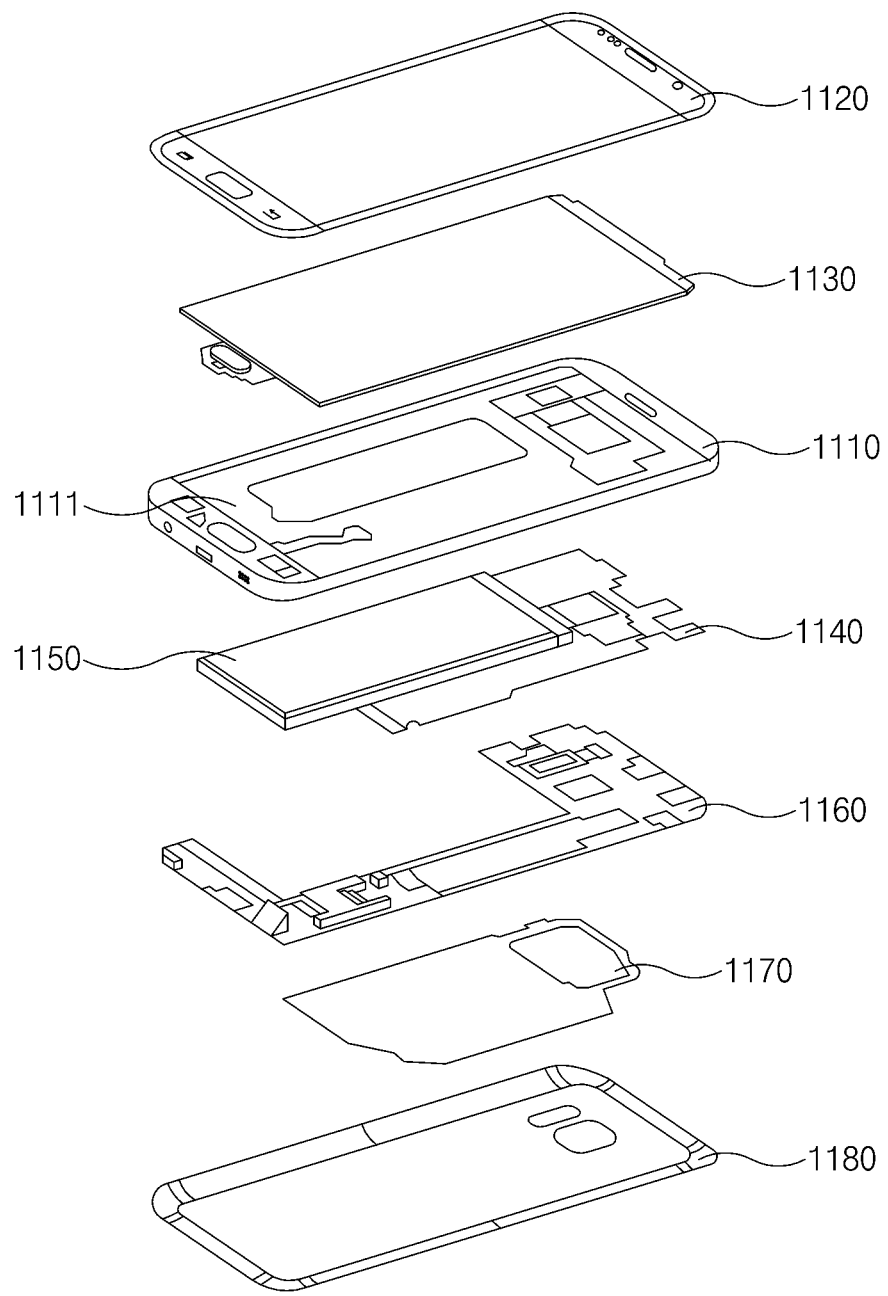
FIG. 11 illustrates an exploded perspective view of an electronic device according to an embodiment.

FIG. 11 illustrates an exploded perspective view of an electronic device according to an embodiment.

Referring to FIG. 11, the electronic device includes a side bezel structure 1110, a first supporting member 1111 (e.g., a bracket), a front plate 1120, a display 1130, a printed circuit board 1140, a battery 1150, a second supporting member 1160 (e.g., a rear case), an antenna 1170, and a rear plate 1180. Alternatively, the electronic device may omit at least one of the components (e.g., the first supporting member 1111 or the second supporting member 1160) or may further include an additional component.

The first supporting member 1111 may be disposed inside the electronic device to be connected to or to be integrally formed with the side bezel structure 1110. The first supporting member 1111 may be formed of a metallic material and/or non-metallic material (e.g., a polymer). The display 1130 may be coupled to one side of the first supporting member 1111 and the printed circuit board 1140 may be coupled to the other side of the first supporting member 1111. The printed circuit board 1140 may be equipped with a processor, a memory, and/or an interface. The processor may include one or more of a CPU, an application processor (AP), a graphics processing unit (GPU), an ISP, a sensor hub processor, or a communications processor (CP).

The memory may include a volatile memory or a non-volatile memory.

The interface may include a high definition multimedia interface (HDMI), a USB interface, a secure digital (SD) card interface, and/or an audio interface. The interface may electrically or physically connect the electronic device to an external electronic device and may include an USB connector, an SD card/multimedia card (MMC) connector, or an audio connector.

The battery 1150 supplies power to at least one of the components of the electronic device and may include a primary cell not rechargeable, a secondary cell rechargeable, or a fuel cell. At least a part of the battery 1150 may be disposed on the substantially same plane as the printed circuit board 1140. The battery 1150 may be integrally disposed inside the electronic device or may be attachably/detachably disposed within the electronic device.

The antenna 1170 may be disposed between the rear plate 1180 and the battery 1150. The antenna 1170 may include a near filed communication (NFC) antenna, a wireless charging antenna, and/or a magnetic secure transmission (MST) antenna. The antenna 1170 may perform short-range communication with an external electronic device or may wirelessly transmit/receive power for charging. An antenna structure may also be formed by a part of the side bezel structure 1110 and/or the first supporting member 1111 or the combination thereof.

Figure 12:
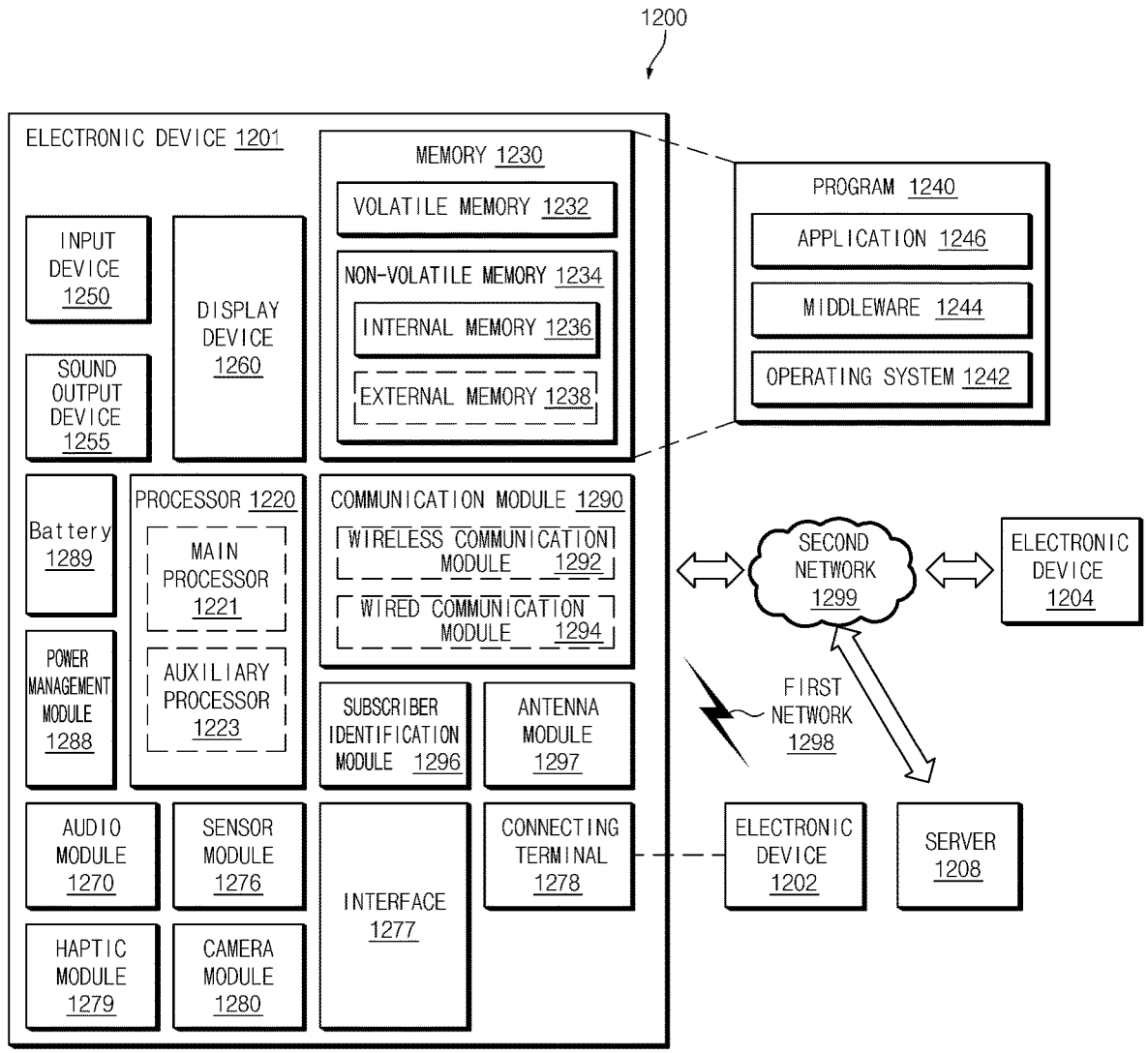
FIG. 12 illustrates an electronic device in a network environment according to an embodiment.

FIG. 12 is a block diagram illustrating an electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a CPU or an AP), and an auxiliary processor 1223 (e.g., a GPU, an ISP, a sensor hub processor, or a CP) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, an HDMI, a USB interface, an SD card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the AP) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an exemplary embodiment, the camera module may be mounted to the end of the window glass. Thus, the bezel region may be reduced and the display region may be expanded. In addition, image distortion of the camera module due to the curved glass may be prevented.

Additionally, various effects that are directly or indirectly grasped through the specification may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a housing including a first surface and a second surface opposite to the first surface, the first surface including a display region and a bezel region extending from at least a portion of an edge of the display region; the bezel region including a curved region and an opening region at least partially surrounded by the curved region, and the curved region being bent such that a gap between the first surface and the second surface decreases as a distance from the display region increases;
    a camera module disposed inside the electronic device; and
    a bracket supporting the camera module,
    wherein the camera module includes:
        a lens assembly including a lens;
        a driver controlling the lens assembly; and
        a planar glass protecting the lens assembly, and
    wherein the planar glass is disposed at the opening region of the first surface.

2. The electronic device of claim 1, wherein the first surface forms at least a portion of a front surface of the electronic device.

3. The electronic device of claim 1, further comprising a display that is visually exposed at the display region of the first surface.

4. The electronic device of claim 1, further comprising a cover glass disposed on the first surface to cover the display region and the curved region, and
    wherein a portion of the cover glass and the planar glass are connected to form a step.

5. The electronic device of claim 4, further comprising a second protector disposed between the planar glass and the cover glass and forming the first surface of the housing with the planar glass and the cover glass,
    wherein the second protector comprises an inclined surface extending obliquely from a surface of the cover glass to a surface of the planar glass.

6. The electronic device of claim 1, wherein the first surface forms at least a portion of a rear surface of the electronic device, and
    wherein the first surface comprises a non-conductive material or a light transmitting material.

7. The electronic device of claim 1, further comprising an image signal processor (ISP) electrically connected to the camera module,
    wherein the ISP acquires an image based on light passing through the planar glass.

8. The electronic device of claim 1, wherein the opening region is completely surrounded by the curved region.

9. The electronic device of claim 1, wherein the opening region is formed at an end of the bezel region.

10. The electronic device of claim 1, wherein the opening region is formed in a U-cut shape.

11. An electronic device, comprising:
    a housing including a first surface and a second surface opposite to the first surface;
    a first glass disposed on the first surface of the housing and including a display region and a bezel region surrounding at least a part of the display region, the bezel region including a curved portion formed in a curved shape, the curved portion being bent such that a gap between the first surface and the second surface decreases as a distance from the display region increases;
    a display disposed within the housing, below the display region; and
    a sensor module disposed within the housing, the sensor module including a sensor and a second glass having a flat surface, which is disposed on the sensor,
    wherein at least one opening region is formed at the curved portion of the bezel region, and
    wherein the second glass of the sensor module is positioned at the opening region.

12. The electronic device of claim 11, wherein the opening region is formed at an end of the bezel region.

13. The electronic device of claim 11, wherein the housing includes a second surface facing the first surface where at least a part of the second glass is formed, and
    wherein the sensor module further includes a bracket that is supported at a first side on the second surface to fasten the sensor within the housing.

14. The electronic device of claim 13, wherein a second side of the bracket includes a supporting protrusion inward protruding from the bracket, and
    wherein at least a part of the sensor is disposed between the supporting protrusion and the second surface.

15. The electronic device of claim 14, wherein the sensor includes a stepped surface facing the second glass and the stepped surface is supported by the supporting protrusion.

\* \* \* \* \*